(12) United States Patent
Na et al.

(10) Patent No.: US 10,599,383 B2
(45) Date of Patent: Mar. 24, 2020

(54) METHOD AND APPARATUS FOR VISUALIZING MUSIC INFORMATION

(71) Applicant: Samsung Electronics Co., Ltd., Gyeonggi-do (KR)

(72) Inventors: Hae-Ree Na, Seoul (KR); Ji-Hee Yoon, Gyeonggi-do (KR); Jin-Hyung Cho, Gyeonggi-do (KR); Ja-Kyoung Lee, Seoul (KR); Hye-Eun Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 478 days.

(21) Appl. No.: 14/744,604

(22) Filed: Jun. 19, 2015

(65) Prior Publication Data
US 2016/0035323 A1 Feb. 4, 2016

(30) Foreign Application Priority Data
Jul. 31, 2014 (KR) ........................ 10-2014-0098355

(51) Int. Cl.
*G06F 3/16* (2006.01)
*G06F 3/0488* (2013.01)
(Continued)

(52) U.S. Cl.
CPC ............ *G06F 3/165* (2013.01); *G06F 3/0486* (2013.01); *G06F 3/04883* (2013.01);
(Continued)

(58) Field of Classification Search
CPC .... G06F 3/165; G06F 3/0486; G06F 3/04883; G06T 11/60; G09G 2340/14; G09G 2320/0626; G09G 5/00; G09G 2354/00
See application file for complete search history.

(56) References Cited

U.S. PATENT DOCUMENTS

2002/0138853 A1* 9/2002 Chuuma ................. A63F 13/10
725/141
2002/0163533 A1* 11/2002 Trovato ................. G10H 1/368
715/728
(Continued)

FOREIGN PATENT DOCUMENTS

CN 101496389 A 7/2009
CN 101577114 A 11/2009
(Continued)

OTHER PUBLICATIONS

Mesaros, "Singing voice identification and lyrics transcription for music information retrieval", (Oct. 16-19, 2013), IEEE, 2013 7th Conference on Speech Technology and Human-Computer Dialogue (SpeD), p. 1-10 (Year: 2013).*
(Continued)

*Primary Examiner* — Ajay M Bhatia
*Assistant Examiner* — Mong-Shune Chung
(74) *Attorney, Agent, or Firm* — Cha + Reiter, LLC.

(57) ABSTRACT

A method for operating an electronic device is provided, including: obtaining music information associated with music that is being played by the electronic device; and outputting a visual effect through a display of the electronic device based on the music information. According to another aspect of the disclosure, an electronic device is provided including a display and a processor configured to: obtain music information associated with music that is being played by the electronic device; and output a visual effect through the display based on the music information.

10 Claims, 15 Drawing Sheets

(51) Int. Cl.
  *G06F 3/0486* (2013.01)
  *G06T 11/60* (2006.01)
  *G09G 5/00* (2006.01)

(52) U.S. Cl.
  CPC ............... *G06T 11/60* (2013.01); *G09G 5/00* (2013.01); *G09G 2320/0626* (2013.01); *G09G 2340/14* (2013.01); *G09G 2354/00* (2013.01)

(56) References Cited

U.S. PATENT DOCUMENTS

| | | | | |
|---|---|---|---|---|
| 2006/0218505 | A1* | 9/2006 | Compton | G06F 16/433 715/781 |
| 2007/0193437 | A1* | 8/2007 | Kong | G10H 1/361 84/610 |
| 2008/0026690 | A1 | 1/2008 | Foxenland | |
| 2009/0177966 | A1* | 7/2009 | Chaudhri | G06F 1/1626 715/716 |
| 2010/0013780 | A1* | 1/2010 | Ikeda | G06F 3/04883 345/173 |
| 2010/0058253 | A1* | 3/2010 | Son | G06F 1/1616 715/863 |
| 2010/0097523 | A1* | 4/2010 | Shin | H04N 5/278 348/468 |
| 2010/0131464 | A1* | 5/2010 | Geleijnse | G06F 17/30056 707/611 |
| 2011/0015765 | A1* | 1/2011 | Haughay, Jr. | G06T 13/205 700/94 |
| 2011/0022958 | A1* | 1/2011 | Kang | G06F 9/451 715/716 |
| 2011/0283236 | A1* | 11/2011 | Beaumier | G07F 11/002 715/835 |
| 2011/0292052 | A1* | 12/2011 | Choi | G10H 1/361 345/467 |
| 2012/0124473 | A1 | 5/2012 | Kim et al. | |
| 2012/0311444 | A1* | 12/2012 | Chaudhri | G06F 3/04883 715/716 |
| 2013/0110838 | A1* | 5/2013 | Lidy | G06F 17/30061 707/737 |
| 2013/0145316 | A1* | 6/2013 | Heo | G06F 3/04817 715/810 |
| 2014/0198065 | A1* | 7/2014 | Otsu | G06F 3/0488 345/173 |
| 2014/0210812 | A1* | 7/2014 | Huang | G10H 1/0008 345/419 |

FOREIGN PATENT DOCUMENTS

| | | |
|---|---|---|
| CN | 101656090 A | 2/2010 |
| CN | 103927175 A | 7/2014 |
| EP | 2 204 721 A2 | 7/2010 |
| EP | 2 211 279 A2 | 7/2010 |
| JP | 2008268774 A * | 11/2008 |
| KR | 10-0657111 B1 | 12/2006 |
| KR | 10-2009-0063453 A | 6/2009 |
| KR | 10-2011-0103926 A | 9/2011 |
| KR | 10-2012-0051343 A | 5/2012 |
| KR | 10-2012-0129570 A | 11/2012 |

OTHER PUBLICATIONS

European Search Report dated Mar. 7, 2018.
European Search Report dated Jul. 19, 2019.
Chinese Search Report dated Aug. 5, 2019.

* cited by examiner

METHOD AND APPARATUS FOR VISUALIZING MUSIC INFORMATION

CLAIM OF PRIORITY

The present application is related to and claims the benefit under 35 U.S.C. § 119(a) of a Korean patent application No. 10-2014-0098355 filed in the Korean Intellectual Property Office on Jul. 31, 2014, the entire disclosure of which is hereby incorporated by reference.

BACKGROUND

1. Field of the Disclosure

The present disclosure relates to electronic devices and more particularly to a method and apparatus for visualizing music information.

2. Description of Related Art

With advances in information communication technologies and semiconductor technologies, various electronic devices are evolving into multimedia devices for providing various multimedia services. For example, the electronic device provides various multimedia services such as a messenger server, a broadcasting service, a wireless Internet service, a camera service, and a music play service.

Using an audio service such as a music play service, a user can listen to music and concurrently enjoy music contents such as lyrics or album art displayed in a display screen.

A conventional music play service visualizes a subjective property of emotion in music so as to facilitate searching and accessing to more various music, but requires user's understanding without considering preference of an individual user. In addition, the conventional music play service indiscriminately shows unnecessary information in the music play to thus cause confusion and muddle to the user.

The above information is presented as background information only to assist with an understanding of the present disclosure. No determination has been made, and no assertion is made, as to whether any of the above might be applicable as prior art with regard to the present disclosure.

SUMMARY

The present disclosure addresses this need. According to one aspect of the disclosure, a method for operating an electronic device is provided, comprising: obtaining music information associated with music that is being played by the electronic device; and visual effect based on the music information.

According to another aspect of the disclosure, an electronic device is provided comprising a display and a processor configured to: obtain music information associated with music that is being played by the electronic device; and outputting a visual effect based on the music information.

BRIEF DESCRIPTION OF THE DRAWINGS

The above and other aspects, features, and advantages of various aspects of the present disclosure will be more apparent from the following detailed description taken in conjunction with the accompanying drawings, in which.

Throughout the drawings, like reference numerals will be understood to refer to like parts, components and structures.

DETAILED DESCRIPTION

Figure 1:
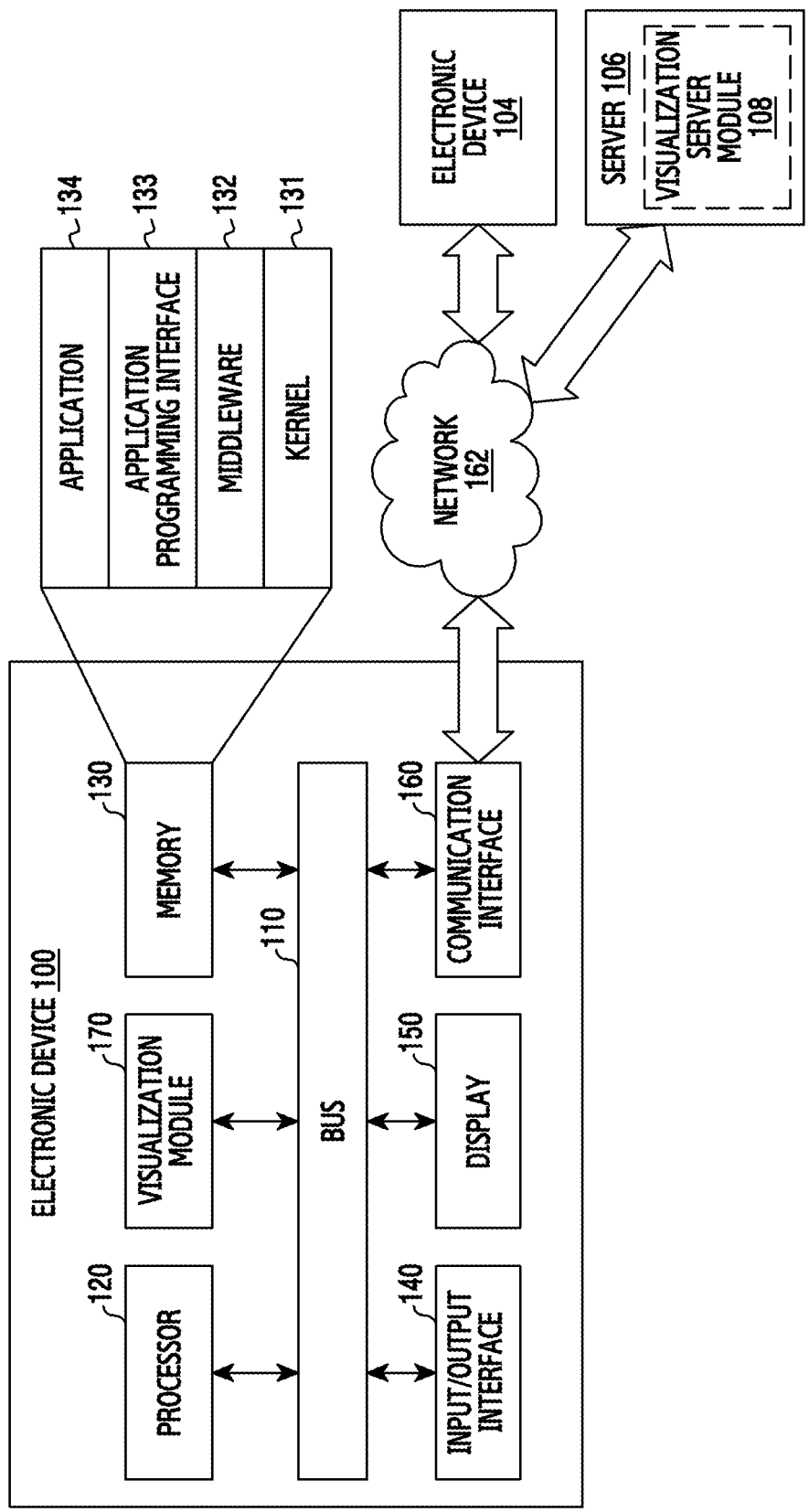
FIG. 1 is a diagram of an example of an electronic device, according to aspects of the disclosure.

The following description with reference to the accompanying drawings is provided to assist in a comprehensive understanding of embodiments of the disclosure as defined by the claims and their equivalents. It includes various specific details to assist in that understanding but these are to be regarded merely as examples. Accordingly, those of ordinary skill in the art will recognize that various changes and modifications of the embodiments described herein can be made without departing from the scope and spirit of the present disclosure. In addition, descriptions of well-known functions and constructions can be omitted for clarity and conciseness.

As used in the present disclosure, terms such as "includes" or "can include" refer to the presence of the corresponding function, operation or feature, and do not limit the presence of additional functions, operations or features. Also, terms such as "includes" or "has" refer to the presence of characteristics, numbers, steps, operations, components or combinations thereof, and is not intended to exclude one or more additional characteristics, numbers, steps, operations, components or combinations thereof.

As used in the present disclosure, the term "or" is used to include any and all combination of terms listed. For examples, "A or B" includes only A, only B, or both A and B.

As used in the present disclosure, terms such as "first" or "second" can be used to describe various features, but do not limit such features. For example, the terms do not limit the order and/or the importance of their associated features. Such terms can be used to differentiate one feature from another. For example, a first user equipment (UE) and a second user equipment are both user equipment, but are different user equipment. For example, without departing from the scope of the present disclosure, a first component can be referred to as a second component, and likewise, a second component can be referred to as a first component.

If a component is said to be "connected with" or "connected to" another component, the component can be directly connected with, or connected to, the other component, or another component can exist in between. On the other hand, if a component is said to be "directly connected with" or " directly connected to" another component, it should be understood that no components exist in between.

By the term "substantially" it is meant that the recited characteristic, parameter, or value need not be achieved exactly, but that deviations or variations, including for example, tolerances, measurement error, measurement accuracy limitations and other factors known to those of skill in the art, can occur in amounts that do not preclude the effect the characteristic was intended to provide.

The term "module" used in an embodiment of the present disclosure indicates, for example, a unit including a combination of one or more of hardware, software, or firmware. The term "module" can be interchangeably used with the terms, for example, "unit," "logic," "logical block," "component," or "circuit." The "module" can be a minimum unit or part of the components integrally formed. The "module" can be a minimum unit or part of one or more functions. The "module" can be implemented mechanically or electronically. For example, the "module" can include at least one of an Application-Specific Integrated Circuit (ASIC), a Field-Programmable Gate Array (FPGA), or a programmable-logic device for performing operations which are well known or will be developed.

Unless defined otherwise, all terms used herein have the same meaning as commonly understood by those of skill in the art. Such terms as those defined in a generally used dictionary are to be interpreted to have the same meanings as the contextual meanings in the relevant field of art, and are not to be interpreted to have ideal or excessively formal meanings unless clearly defined in the present specification.

An electronic device according to various embodiments of the present disclosure can be a device including communication functionality. For example, the electronic device can include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical appliance, a camera, and a wearable device (e.g., a Head Mounted Device (HMD) such as electronic glasses, electronic textiles, an electronic bracelet, an electronic necklace, an electronic appcessory, an electronic tattoo, and a smart watch).

According to various embodiments of the present disclosure, an electronic device can be a smart home appliance having the communication functionality. The smart home appliance can include, for example, at least one of a television, a Digital Video Disk (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), game consoles, an electronic dictionary, a digital key, a camcorder, and a digital frame.

According to various embodiments of the present disclosure, an electronic device can include at least one of various medical appliances (e.g., Magnetic Resonance Angiography (MRA), Magnetic Resonance Imaging (MRI), Computed Tomography (CT), X-ray system, ultrasonicator), a navigation device, a Global Positioning System (GPS) receiver, an Event Data Recorder (EDR), a Flight Data Recorder (FDR), an in-vehicle infotainment device, marine electronic equipment (e.g., marine navigation device and gyro compass), an avionic system, a security device, and an industrial or home robot.

According to various embodiments of the present disclosure, an electronic device can include at least one of part of furniture or building/structure having the communication functionality, an electronic board, an electronic signature receiving device, a projector, and various gauges (e.g., gauges for water, electricity, gas, and radio waves).

An electronic device according to various embodiments of the present disclosure can be one or a combination of those various devices. The electronic device can be a flexible device. Also, those skilled in the art should understand that the electronic device is not limited to those devices.

Hereinafter, embodiments of the present disclosure provide an electronic device by referring to the attached drawings. The term 'user' used in embodiments of the present disclosure can represent a person or a device (e.g., an artificial intelligent electronic device) who or which uses the electronic device.

FIG. 1 is a diagram of an example of an electronic device, according to aspects of the disclosure. Referring to FIG. 1, the electronic device 100 includes a bus 110, a processor 120, a memory 130, an input/output interface 140, a display 150, a communication interface 160, and a visualization module 170. The visualization module 170 can be included in the processor 120 or in a separate module. Hereinafter, the visualization module 170 is described as being included in the processor 120.

The bus 110 interlinks the components (e.g., the processor 120, the memory 130, the input/output interface 140, the display 150, the communication interface 160, and the visualization module 170) of the electronic device 100 and controls communications between the components.

The processor 120 may include any suitable type of processing circuitry. For example, the processor 120 may include one or more of a general-purpose processor (e.g., an ARM-based processor), an Application-Specific Integrated Circuit (ASIC), a Field-Programmable Gate Array (FPGA), and/or a Digital Signal Processor (DSP). The processor 120 receives an instruction from the components (e.g., the memory 130, the input/output interface 140, the display 150, the communication interface 160, and the visualization module 170) of the electronic device 100 via the bus 110, interprets the received instruction, and performs an operation or processes data according to the interpreted instruction. The processor 120 executes at least one program stored in the memory 130 and provides a service corresponding to the program.

The memory 130 stores instruction(s) or the data received from or generated by one or more components (e.g., the processor 120, the input/output interface 140, the display 150, the communication interface 160, and the visualization module 170) of the electronic device 100.

The memory 130 stores one or more programs. For example, the memory 130 can store a kernel 131, a middleware 132, an Application Programming Interface (API) 133, and an application 134. Any of these programs can be implemented using a program module, and the programming module can be implemented using software, firmware, and hardware, or a combination of at least two of them.

The kernel 131 controls or manages system resources (e.g., the bus 110, the processor 120, and the memory 130)

used to execute operations or functions of the other programming modules (e.g., the middleware 132, the API 133, or the application 134). Also, the kernel 131 provides an interface allowing the middleware 132, the API 133, or the application 134 to access, control or manage the individual components of the electronic device 100.

The middleware 132 relays data between the API 133 or the application 134 and the kernel 131. The middleware 132 load-balances task requests received from at least one application by giving priority of the system resource (e.g., the bus 110, the processor 120, or the memory 130) of the electronic device 100 to the task requests.

The API 133, which is an interface for the application 134 to control a function provided from the kernel 131 or the middleware 132, can include at least one interface or function (e.g., instruction) for file control, window control, image processing, or text control.

The application 134 can include a Short Message Service (SMS)/Multimedia Messaging Service (MMS) application, an e-mail application, a calendar application, an alarm application, a health care application (e.g., an application for measuring an amount of exercise, a blood sugar level, and/or the like), or an environmental information application (e.g., an application for providing air pressure, humidity, temperature information, and/or the like). Alternatively, the application 134 can be involved in information exchange between the electronic device 100 and an external electronic device (e.g., an electronic device 104). The information exchange application can include, for example, a notification relay application for relaying certain information to an external electronic device or a device management application for managing the external electronic device.

For example, the notification relay application can relay the notification information of another application (e.g., an SMS/MMS application, an e-mail application, a health care application, an environmental information application, and/or the like) executed on the electronic device 100 to the external electronic device 104. Alternatively, the notification relay application can receive and provide to the other application information received from the external electronic device 104. The device management application turns on/off at least part of the function (e.g., the external electronic device (or some other components)) of the external electronic device 104 communicating with the electronic device 100, control brightness (or resolution) of the display, and manages (e.g., install, delete, or update) the service (e.g., a call service or a messaging service) provided by an application of the external electronic device or by the external electronic device itself.

The application 134 can include an application designated based on an attribute (e.g., a type of the electronic device) of the external electronic device 104. For example, when the external electronic device is an MP3 player, the application 134 can include a music playing application. Similarly, when the external electronic device is a mobile medical device, the application 134 can include a health care application. The application 134 can include at least one of the application designated in the electronic device 100 and the application received from a server 106, the electronic device 104.

The input/output interface 140 forwards an instruction or data input from the user through an input/output device (e.g., a sensor, a keyboard, or a touch screen) to, for example, the processor 120, the memory 130, the communication interface 160, or the visualization module 170 via the bus 110. For example, the input/output interface 140 can forward data of the user's touch input through the touch screen, to the processor 120. For example, the input/output interface 140 can output an instruction or data received from the processor 120, the memory 130, the communication interface 160 or the visualization module 170 via the bus 110, through an input/output device (e.g., a speaker or a display). For example, the input/output interface 140 can output voice data processed by the processor 120 to the user through the speaker.

The display 150 displays various information (e.g., multimedia data or text data) to the user.

The communication interface 160 establishes the communication between the electronic device 100 and the external device 104, or the server 106. For example, the communication interface 160 can communicate with the external device over the network 162 using wireless communication or wired communication. The wireless communication can include at least one of, for example, Wireless Fidelity (WiFi), Bluetooth (BT), Near Field Communication (NFC), GPS, and cellular communication (e.g., Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)). The wired communication can include at least one of, for example, a Universal Serial Bus (USB), a High Definition Multimedia Interface (HDMI), a Recommended Standard (RS) 232, a Plain Old Telephone Service (POTS), and/or the like.

The network 162 can be the communication network. The communication network can include at least one of a computer network, the Internet, the Internet of things, and a telephone network. The protocol (e.g., transport layer protocol, data link protocol, or physical layer protocol) for the communication between the electronic device 100 and the external device can be supported by at least one of the application 134, the API 133, the middleware 132, the kernel 131, and the communication interface 160.

The visualization module 170 can obtain music information from a music file or information associated with music that is being played, analyze the obtained music information, and visualize the music information based on the analyzed music information. The visualization module 170 can obtain attribute information or play information of the music file. The attribute information of the music file can include music information indicating attributes of the music file. By way of example, the attributes may include at least one of a file type, a file name, a file size, a music genre, a music title, a singer, lyrics, and an album art of the music file attribute information. The album art can include an image (album cover, album picture) of album information of the music file. The play information can pertain to the music that is being played (e.g., music encoded in the music file). By way of example, the play information may include at least one of a tone, a volume level, a pitch, a rhythm, a tempo, a meter, and a texture of the music. The visualization module 170 can output a special effect on the display based on the music information.

A server 106 can support the electronic device 100 by fulfilling at least one of the operations (or functions) of the electronic device 100. For example, the server 106 can include a visualization server module 108 for supporting the visualization module 170 of the electronic device 100. The visualization server module 108 can include at least one component of the visualization module 170 and perform (e.g., substitute) at least one of the operations of the visualization module 170.

The visualization module 170 can process at least part of information obtained from other components (e.g., the processor 120, the memory 130, the input/output interface 140, and the communication interface 160), and provide the processed information to the user in various ways. For example, the visualization module 170 can control at least part of the functions of the electronic device 100 to interwork with other electronic devices (e.g., the electronic device 104, the server 106) by use of or independently from the processor 120. At least part of the visualization module 170 can be included in the server 106 (e.g., the visualization server module 108), and the server 106 can support at least one operation of the visualization module 170.

Figure 2:
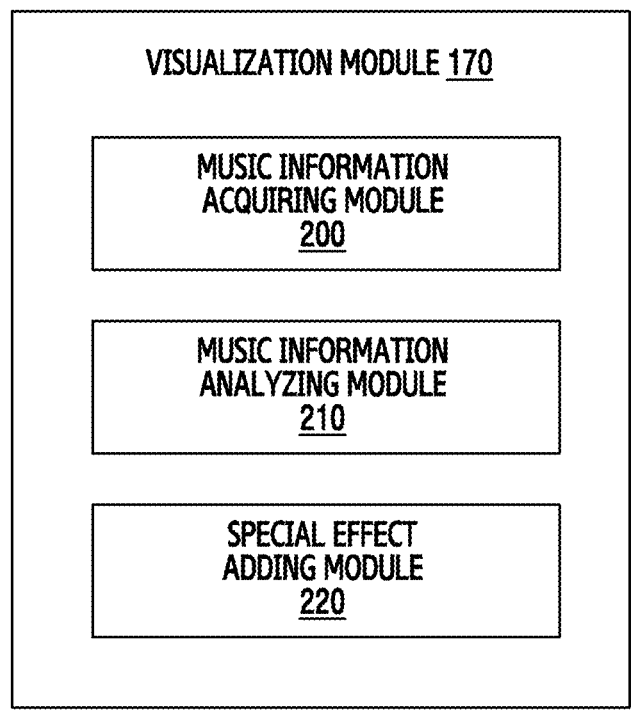
FIG. 2 is a block diagram of an example of a visualization module, according to aspects of the disclosure.

FIG. 2 is a block diagram of an example of a visualization module, according to aspects of the disclosure. Referring to FIG. 2, the visualization module 170 can include a music information acquiring module 200, a music information analyzing module 210, and a special effect adding module 220. Although in this example, the modules 200, 210, and 220 are depicted as separate modules, in some implementations any of the modules 200, 210, and 220 can be integrated together.

The music information acquiring module 200 can collect or obtain music information of a music file stored in an electronic device or an external electronic device (e.g., a server). For example, the music information acquiring module 200 can select or play the music file and acquire attribute information or play information of the music file. The attribute information associated with the music file can include music information indicating attributes of the music file. By way of example, the attributes can include at least one of a file type, a file name, a file size, a music genre, a music title, a singer, lyrics, and an album art in the music file attribute information. The album art can include an image (album cover, album picture) or other information associated with the music file. The play information of the music file can pertain to the music encoded in the music file. By way of example, the play information can include at least one of a tone, a volume level, a pitch, a rhythm, a tempo, a meter, and a texture of the music.

The music information analyzing module 210 can classify or analyze the acquired music information. The music information analyzing module 210 can extract a feature value or a pattern of the acquired music attribute information or music play information, and analyze it using a mathematical algorithm. The music information analyzing module 210 can extract the feature value or pattern from a music feature, a meta music feature, and music emotion information that is identified in the acquired music information.

The special effect adding module 220 can output a special effect based on the analyzed music information. In some implementations, the special effect adding module 220 can change at least one of a brightness, a color, and a chroma setting of the display based on the analyzed music attribute information or music play information. Additionally or alternatively, in some implementations, the special effect adding module 220 can display an object on the display based on the analyzed music attribute information or music play information. The object can include a figure, a letter, and/or any suitable type of visual object. The special effect adding module 220 can impart a motion effect on the figure or the letter. Additionally or alternatively, in some implementations, the special effect adding module 220 can change album art (or another object) that is presented on the display while the music is playing based on the analyzed music attribute information or music play information. The special effect adding module 220 can change at least one of a shape, a size, a color, a brightness, and a chroma of the album art (or another object presented on the display). For example, the special effect adding module 220 can add a figure or a letter to the displayed album art, and change or synthesize the album art in various ways.

The special effect adding module 220 can select the particular special effect that is displayed according to the analyzed music information. Additionally or alternatively, the effect adding module 220 may select the particular special effect based on a user input for the selection of special effects that is received at the device 100. For example, the user can select his/her desired special effect, and set various performances based on a visual, aural, or tactile sense.

According to various embodiments of the present disclosure, an electronic device includes a display and a processor is configured to control to: obtain music information of the electronic device; analyze the obtained music information; and visualize the music information based on the analyzed music information.

The music information can include at least one of attribute information or play information of a music file.

The processor is further configured to obtain at least one of a file type, a file name, a file size, a music genre, a music title, a singer, lyrics, and an album art of the attribute information of the music file, or obtain at least one of a tone, a volume level, a pitch, a rhythm, a tempo, a meter, and a texture of the play information of the music file.

The processor is further configured to extract a feature value or a music pattern of the obtained attribute information or play information of the music file.

The processor is further configured to add a special effect to a display based on the obtained attribute information or play information of the music file.

The processor is further configured to further add the special effect to the display according to a touch input on the display.

The processor is further configured to change at least one of a brightness, a color, and a chroma of the display based on the obtained attribute information or play information of the music file.

The processor is further configured to display an object on the display based on the obtained attribute information or play information of the music file.

The processor is further configured to change lyrics or an album art on the display based on the obtained attribute information or play information of the music file.

The processor is further configured to output a vibration or a sound based on the analyzed music information.

Figure 3:
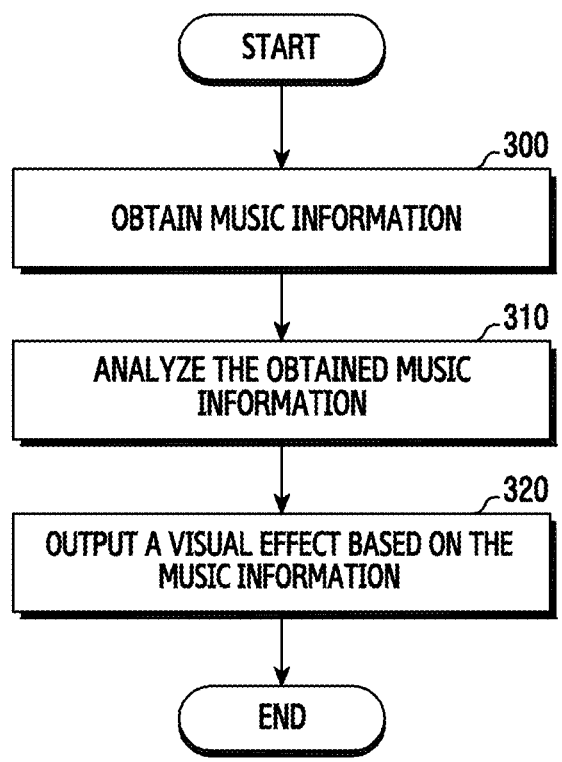
FIG. 3 is a flowchart of an example of a process, according to aspects of the disclosure.

FIG. 3 is a flowchart of an example of a process, according to aspects of the disclosure. Referring to FIG. 3, an electronic device (e.g., the electronic device 100) can obtain music information in operation 300. For example, the electronic device can obtain the music information by selecting or playing a pre-stored music file. As another example, the electronic device can obtain the music information by selecting or playing a music file from an external electronic device (e.g., a server) through a communication. The music information can include attribute information or play information of the music file. The attribute information of the music file can be music information indicating attributes of the music file. By way of example, the attributes may include at least one of a file type, a file name, a file size, a music genre, a music title, a singer, lyrics, and an album art of the music file attribute information. The album art can include an image (album cover, album picture) of album information of the music file. The play information of the music file can pertain to music that is encoded in the music file. By way of example, the play information may include at least one of a tone, a volume level, a pitch, a rhythm, a tempo, a meter, and a texture of the music file.

In operation 310, the electronic device can analyze the obtained music information. The electronic device can extract a feature value or a pattern of the acquired music attribute information or music play information, and analyze it using a mathematical algorithm.

In operation 320, the electronic device can output a visual effect based on the music information. In some implementations, the electronic device can output a special effect based on the analyzed music information. Additionally or alternatively, in some implementations, the electronic device can change at least one of a brightness, a color, and a chroma setting of the display based on the music attribute information or the music play information of the analyzed music information. Additionally or alternatively, in some implementations, the electronic device can display an object on the display based on the analyzed music attribute information or music play information. The object can include a figure, a letter, and/or any suitable type of visual object. The electronic device can impart a motion effect on the figure or the letter. Additionally or alternatively, in some implementations, the electronic device can change album art (or another object) that is presented on the display based on the analyzed music information. The electronic device can change at least one of a shape, a size, a color, a brightness, and a chroma of the album art (or another object presented on the display). For example, the electronic device can add a figure or a letter to the displayed album art, and change or synthesize the album art in various ways.

The electronic device can auralize or tactilize the music information based on the analyzed music information. For example, the electronic device can produce a particular sound to the user based on the analyzed music information. As another example, the electronic device can produce a vibration to the user based on the analyzed music information.

Figure 4:
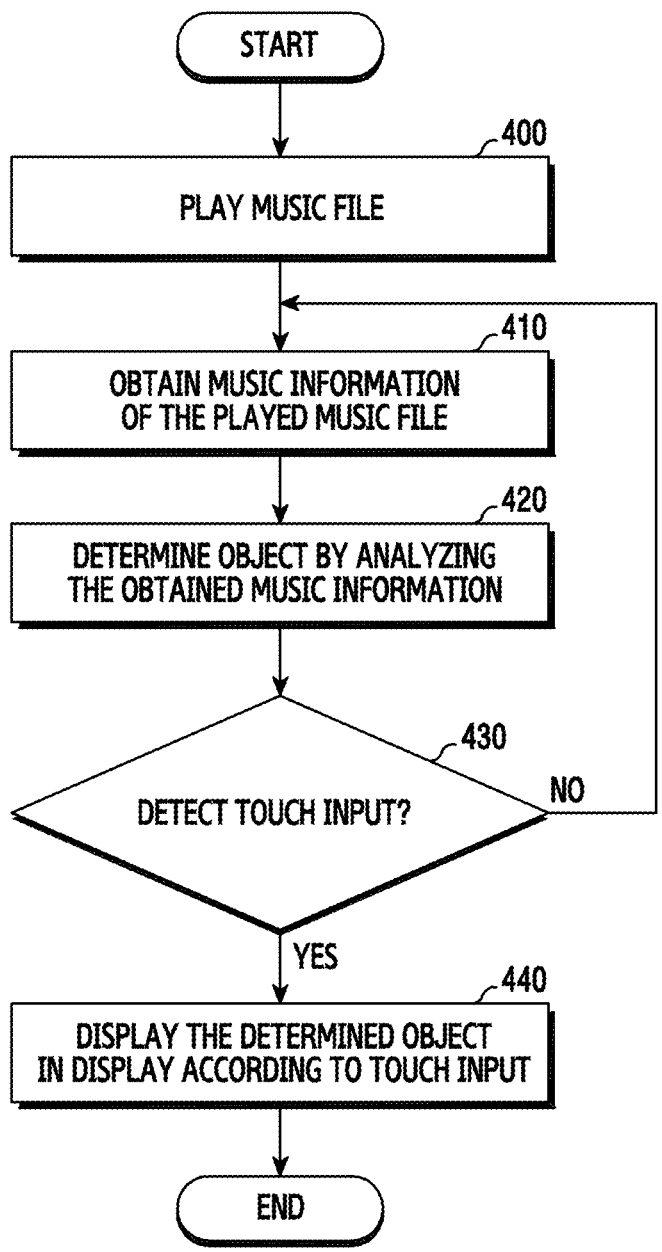
FIG. 4 is a flowchart of an example of a process, according to aspects of the disclosure.

FIG. 4 is a flowchart of an example of a process, according to aspects of the disclosure.

Referring to FIG. 4, in operation 400, an electronic device (e.g., the electronic device 100) can begin playing a music file. For example, the electronic device can execute a pre-stored music file or select a music file to play through an external electronic device (e.g., a server).

In operation 410, the electronic device can obtain music information of the played music file. The electronic device can obtain attribute information or play information of the music file. The attribute information of the music file can be music information indicating attributes of the music file. By way of example, the attributes may include at least one of a file type, a file name, a file size, a music genre, a music title, a singer, lyrics, and an album art of the music file attribute information. The album art can include an image (album cover, album picture) of album information of the music file. The play information of the music file can pertain to the music that is encoded in the music file. By way of example, the play information may include at least one of a tone, a volume level, a pitch, a rhythm, a tempo, a meter, and a texture of the music.

In operation 420, the electronic device can determine an object for presentation on the display by analyzing the obtained music information. The electronic device can extract a feature value or a pattern of the acquired music information, and analyze it using a mathematical algorithm. The electronic device can select an object to display on the display by analyzing the obtained music information. For example, the electronic device can select at least one of a brightness, a color, a figure, an album art, and a motion effect for the object based on the obtained music information.

The electronic device can determine a motion effect range of the object to display on the display according to the pitch being the music play information. The electronic device can determine a motion speed of the object to display on the display according to the tempo being the music play information. The electronic device can determine a figure or a letter to display on the display according to the rhythm being the music play information. The electronic device can determine the brightness of the object according to a genre of the music that is being played. The electronic device can determine the lyrics to display on the display according to the music lyrics being the music file information. The electronic device can determine the color to display on the display according to the album art being the music file information. For example, the electronic device can select a color to display on the display by extracting at least one color from the album art. Various objects can be determined according to the music play information or the music file information.

In operation 430, the electronic device can determine whether a touch input is detected. The electronic device can determine whether a touch input is detected from a finger or an input pen on the display.

When not detecting the touch input, the electronic device can return to operation 410.

Upon detecting the touch input, the electronic device can display the determined object on the display according to the touch input in operation 440. The electronic device can display the determined object in a touched area. For example, the electronic device can display another object according to a continuous touch or a dragging. While the determined object is being displayed, the electronic device can output a vibration or a particular sound in addition.

Figure 5:
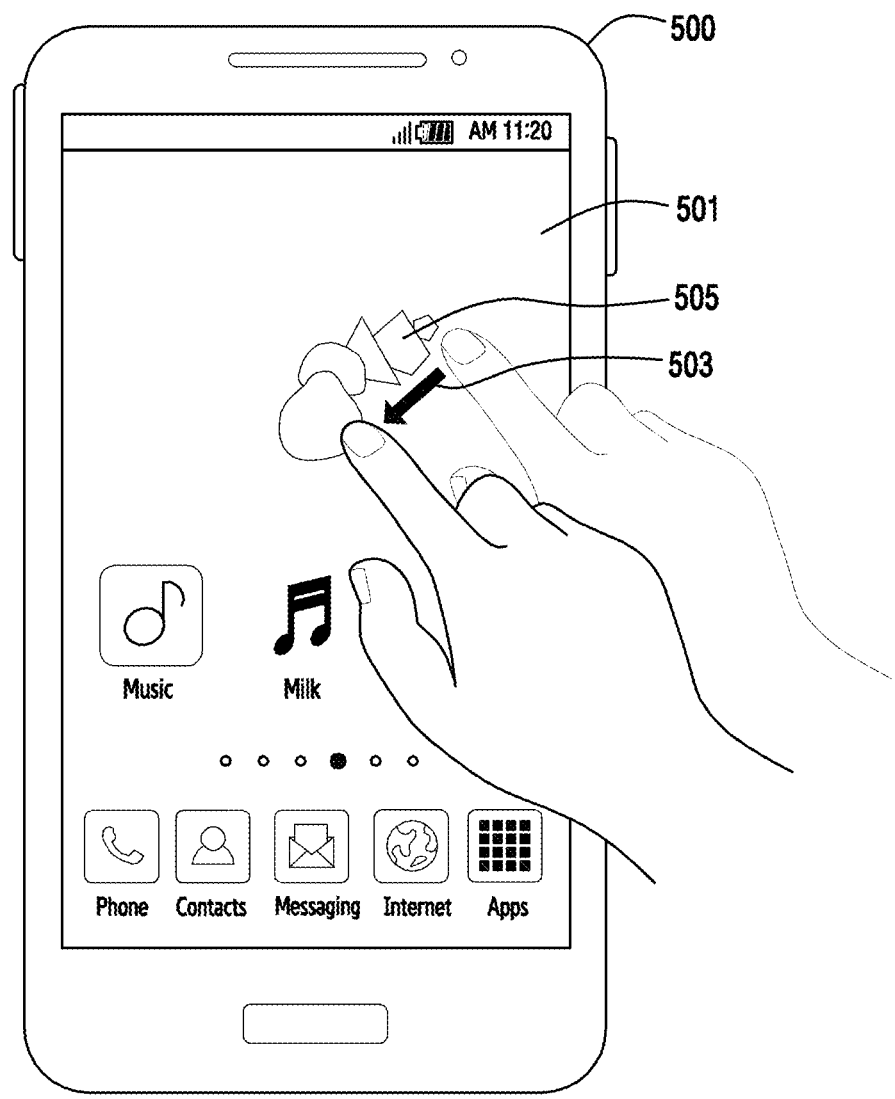
FIG. 5 is a diagram illustrating an example of the operation of the electronic device, according to aspects of the disclosure.

Referring to FIG. 5, the electronic device 500 can detect a continuous touch or a dragging 503 on a home screen 501 and sequentially display FIGS. 505 along the trajectory of the drag. For example, the FIGS. 505 can change into various shapes according to the music information, and disappear after a predetermined period.

Figure 6:
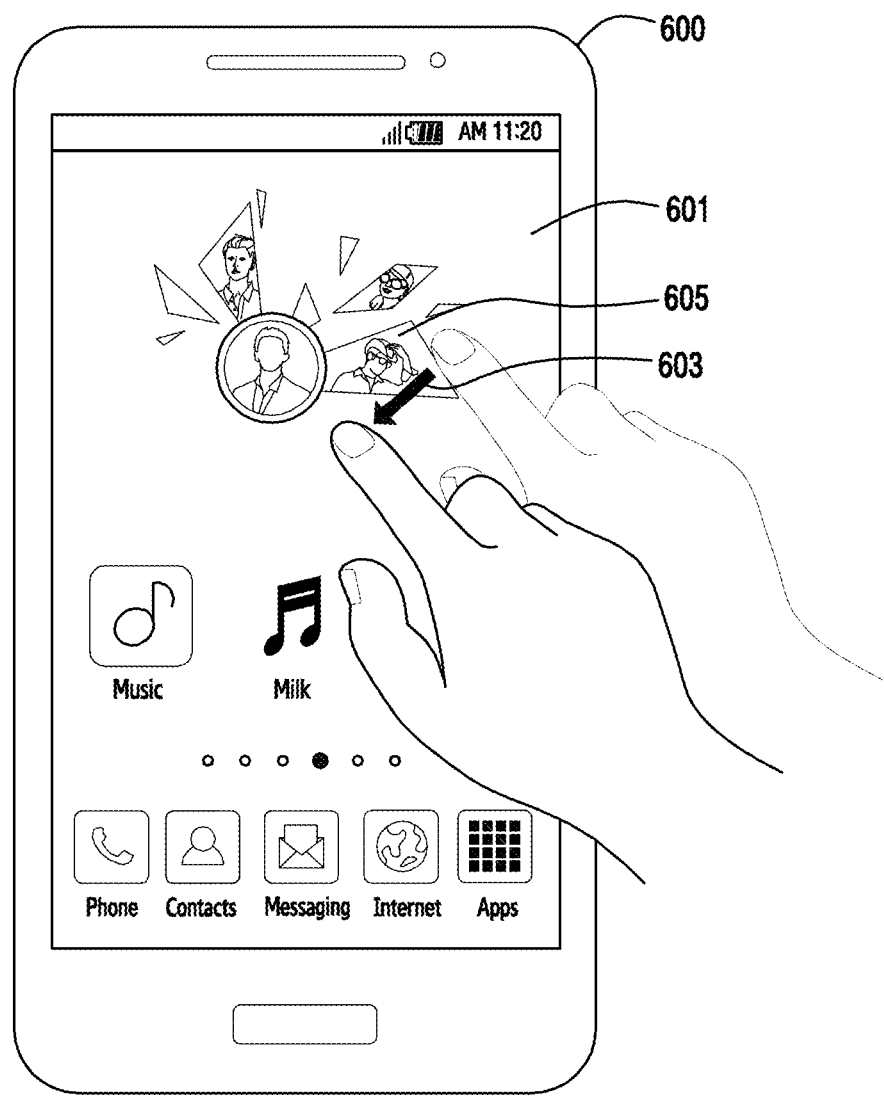
FIG. 6 is a diagram illustrating an example of the operation of the electronic device, according to aspects of the disclosure.

As shown in FIG. 6, an electronic device 600 can detect a continuous touch or a dragging 603 on a home screen 601, and sequentially display particular images 605 that that are obtained from art (e.g., an album cover image) that is associated with music that is currently being played by the electronic device 600. For example, the particular images 605 can include an image of a person, a symbol, and/or any other suitable portion of the art. The electronic device 600 can represent the particular images 605 in, but not limited to, fragments as shown in FIG. 6.

Figure 7:
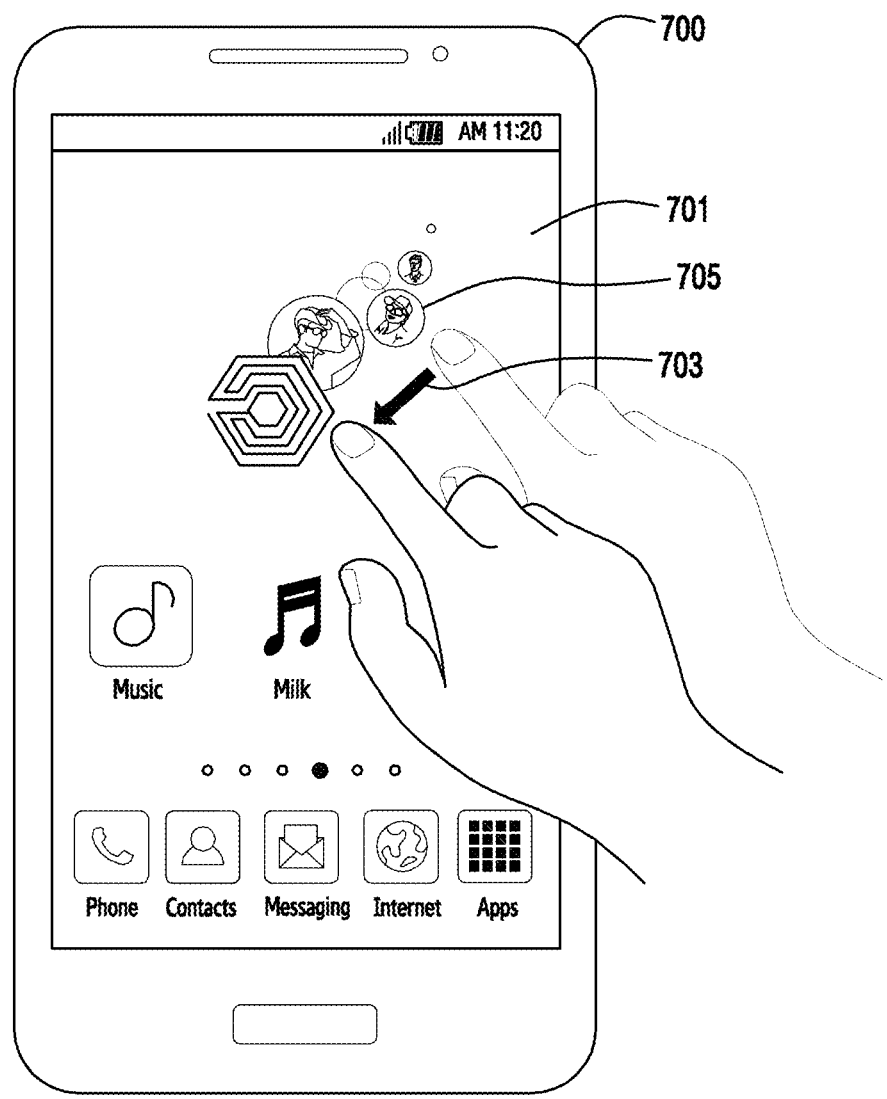
FIG. 7 is a diagram illustrating an example of the operation of the electronic device, according to aspects of the disclosure.

As shown in FIG. 7, an electronic device 700 can detect a continuous touch or a dragging 703 on a home screen 701, and sequentially display particular images 705 of the album art in the dragged area. For example, the particular images 705 can include an image of a person or a symbol in art (e.g., an album cover image) associated with music that is being played. The electronic device 700 can impart a selected shape on the images 705. For example, the electronic device may impart a water-drop shape on the images 705, as shown in FIG. 7. As discussed above, the shape can be selected based on the music information. The electronic device can display the object according to the touch detected in another screen as well as the home screen. For example, the electronic device can display various objects according to the touch or the dragging detected in a lock screen or an application execution screen.

Figure 8:
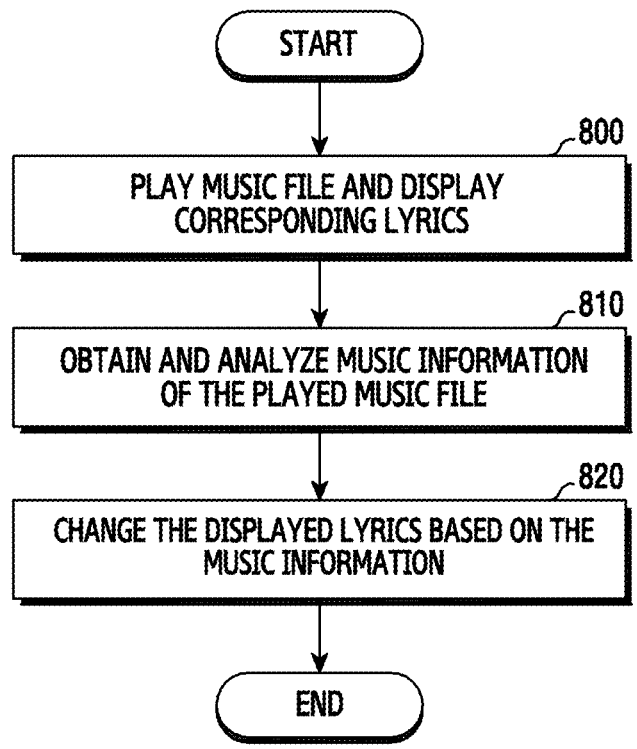
FIG. 8 is a flowchart of an example of a process, according to aspects of the disclosure.

FIG. 8 is a flowchart of an example of a process, according to aspects of the disclosure.

Referring to FIG. 8, in operation 800, an electronic device (e.g., the electronic device 100) can play a music file and/or display lyrics corresponding to the played music. The electronic device can execute a pre-stored music file or select a music file to play through an external electronic device (e.g., a server).

In operation 810, the electronic device can obtain and analyze music information of the played music file. The electronic device can obtain and analyze attribute information or play information of the music file. The attribute information of the music file can be music information indicating attributes of the music file. By way of example, the attribute can include at least one of a file type, a file name, a file size, a music genre, a music title, a singer, lyrics, and an album art of the music file attribute information. The album art can include an image (album cover, album picture) of album information of the music file. The play information of the music file can pertain to the music encoded in the music file. By way of example, the play information can include at least one of a tone, a volume level, a pitch, a rhythm, a tempo, a meter, and a texture of the music. The electronic device can extract a feature value or a pattern of the acquired music information, and analyze it using a mathematical algorithm.

In operation 820, the electronic device can change the displayed lyrics based on the music information. The electronic device can change at least one of a line height, a font size, a letter spacing, and a font color of the displayed lyrics according to the analysis.

The electronic device can change the line height of the displayed lyrics according to the pitch being the music play information. For example, the electronic device can increase the line height of the lyrics as the volume level rises. The electronic device can change the font size of the displayed lyrics according to the volume level being the music play information. For example, the electronic device can increase the font size of the lyrics as the pitch rises. The electronic device can change the letter spacing of the displayed lyrics according to the tempo being the music play information. For example, the electronic device can increase the letter spacing of the lyrics as the tempo is slowed down.

The electronic device can change the font color of the displayed lyrics according to the music file information. For example, when the same lyrics as the music title are present, the electronic device can change the font color of the corresponding lyrics. The electronic device can extract the most used color from the album art of the music file and apply the extracted color to the corresponding lyrics. The electronic device can process the album art to identify an image of the singer (or another person) depicted in the album art. Afterwards, the electronic device may display the image of the singer alongside the lyrics. The electronic device can highlight the lyric corresponding to the currently played music and dim the other lyrics.

Figure 9:
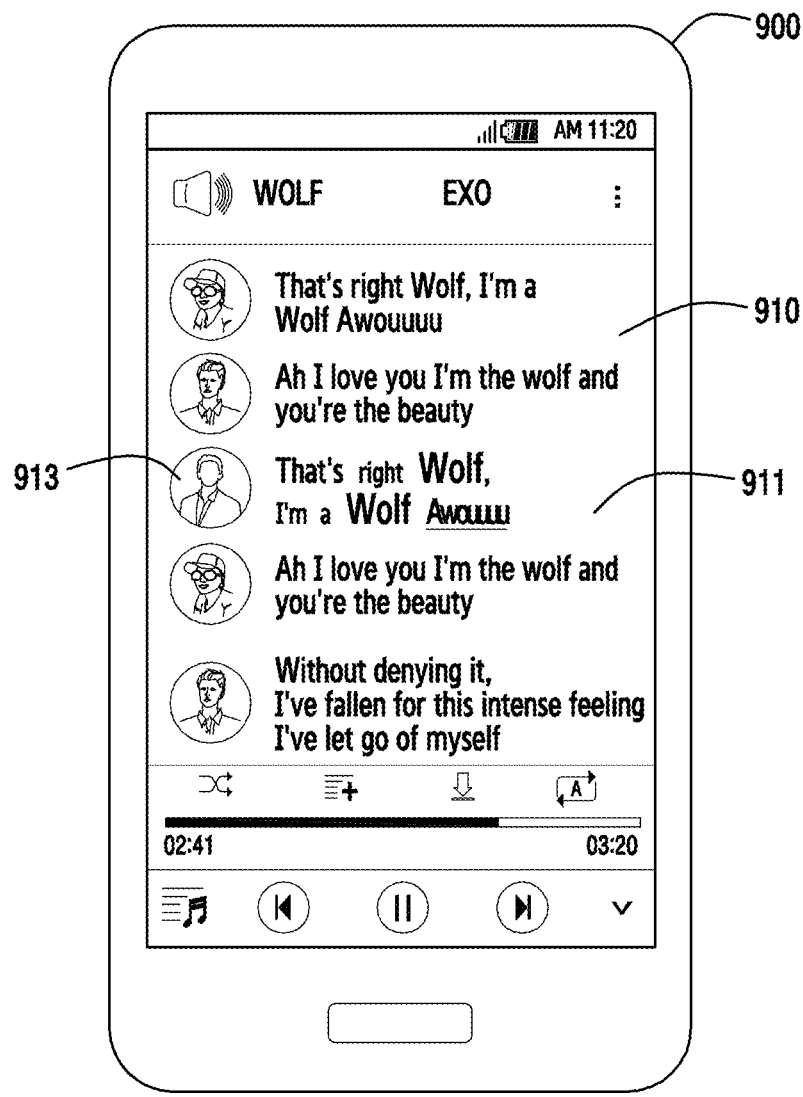
FIG. 9 is a diagram illustrating an example of the operation of the electronic device, according to aspects of the disclosure.

As shown in FIG. 9, an electronic device 900 can play a music file and display lyric information 910 of the music file. The lyric information 910 can include a facial image 913 of a singer according to the corresponding lyrics 911. For example, the electronic device 900 can highlight the corresponding lyric 911 according to the currently played music. The electronic device 900 can variously change the appearance of the corresponding lyric 910 according to the pitch, the volume level, the tempo, the title, the singer, and the music part of the analyzed music information.

Figure 10:
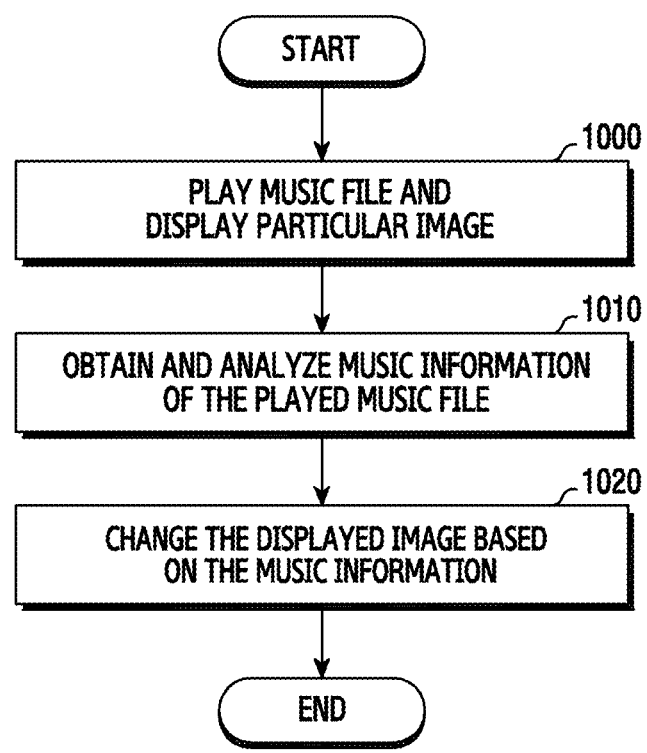
FIG. 10 is a flowchart of an example of a process, according to aspects of the disclosure.
Figure 11:
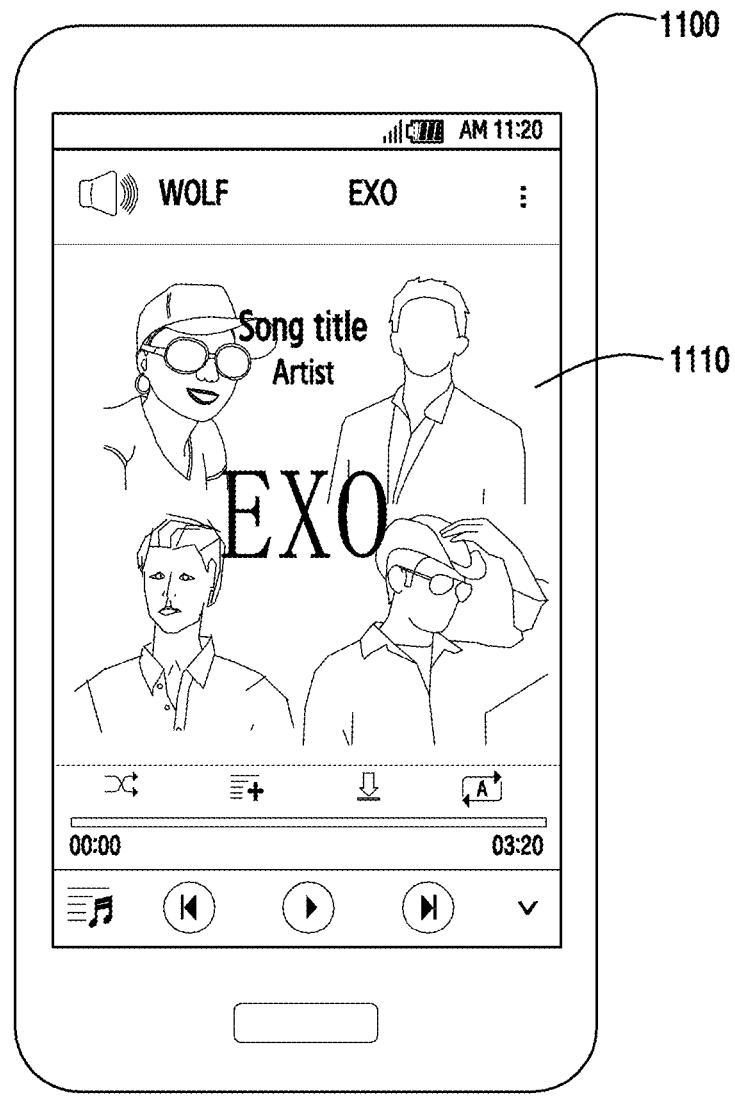
FIG. 11 is a diagram illustrating an example of the operation of the electronic device, according to aspects of the disclosure.

FIG. 10 is a flowchart of an example of a process, according to aspects of the disclosure. In operation 1000, an electronic device (e.g., the electronic device 100) can play a music file of the electronic device and display a particular image on the display. The electronic device can execute a pre-stored music file or select a music file to play through an external electronic device (e.g., a server). For example, an electronic device 1100 can select a music file and display album art (album cover image) 1110 of the corresponding music file as shown in FIG. 11. The electronic device 1100 can display various screen images such as a home screen, a lock screen, and an application screen, as well as the album art 1110.

In operation 1010, the electronic device can obtain and analyze music information of the played music file. The electronic device can obtain and analyze attribute information or play information of the music file. The attribute information of the music file can be music information indicating attributes of the music file. By way of example, the attributes may include at least one of a file type, a file name, a file size, a music genre, a music title, a singer, lyrics, and an album art of the music file attribute information. The album art can include an image (album cover, album picture) of album information of the music file. The play information of the music file can pertain to the music that is encoded in the music file. By way of example, the play information may include at least one of a tone, a volume level, a pitch, a rhythm, a tempo, a meter, and a texture of the music. The electronic device can extract a feature value or a pattern of the acquired music information, and analyze it using a mathematical algorithm.

In operation 1020, the electronic device can change the displayed image based on the music information. The electronic device can change at least one of a shape, a size, a color, a brightness, and a chroma of the displayed image (e.g., the album art) according to the analysis. For example, the electronic device can add a figure or a letter to the displayed album art, and synthesize the album art in various ways.

The electronic device can change an angle of the figure added to the album art according to the pitch being the music play information. The electronic device can change the size of the figure added to the album art according to the volume level being the music play information. The electronic device can change a spacing of the figure added to the album art according to the tempo being the music play information. The electronic device can change the color or the brightness of the album art according to a gender of the singer.

Figure 12:
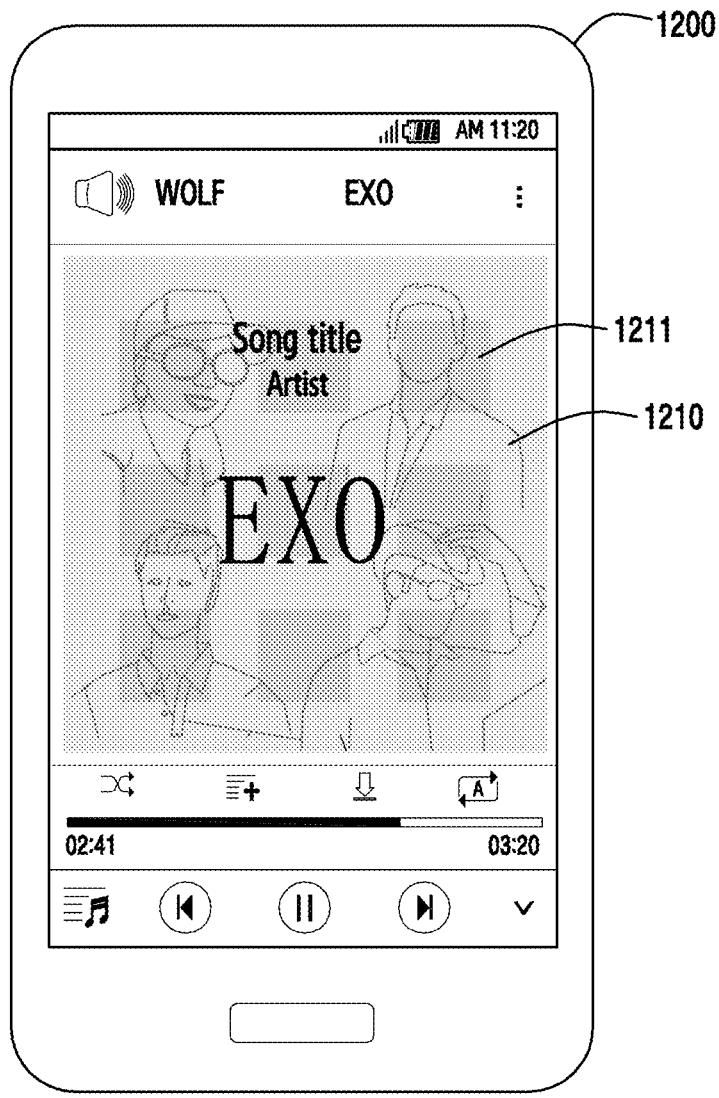
FIG. 12 is a diagram illustrating an example of the operation of the electronic device, according to aspects of the disclosure.

As shown in FIG. 12, an electronic device 1200 can play a music file and display an album art 1210 of the music file. The album art 1210 can include an artist photo or a cover image of the corresponding music file. The electronic device 1200 can add a letter or FIG. 1211 to the album art 1210 according to the analyzed music information. The electronic device 1200 can display more FIGS. 1211 as the pitch or the tempo of the current music rises. For example, the FIG. 1211 can change according to, but not limited to, the pitch, the volume level, and the tempo of the current music.

Figure 13:
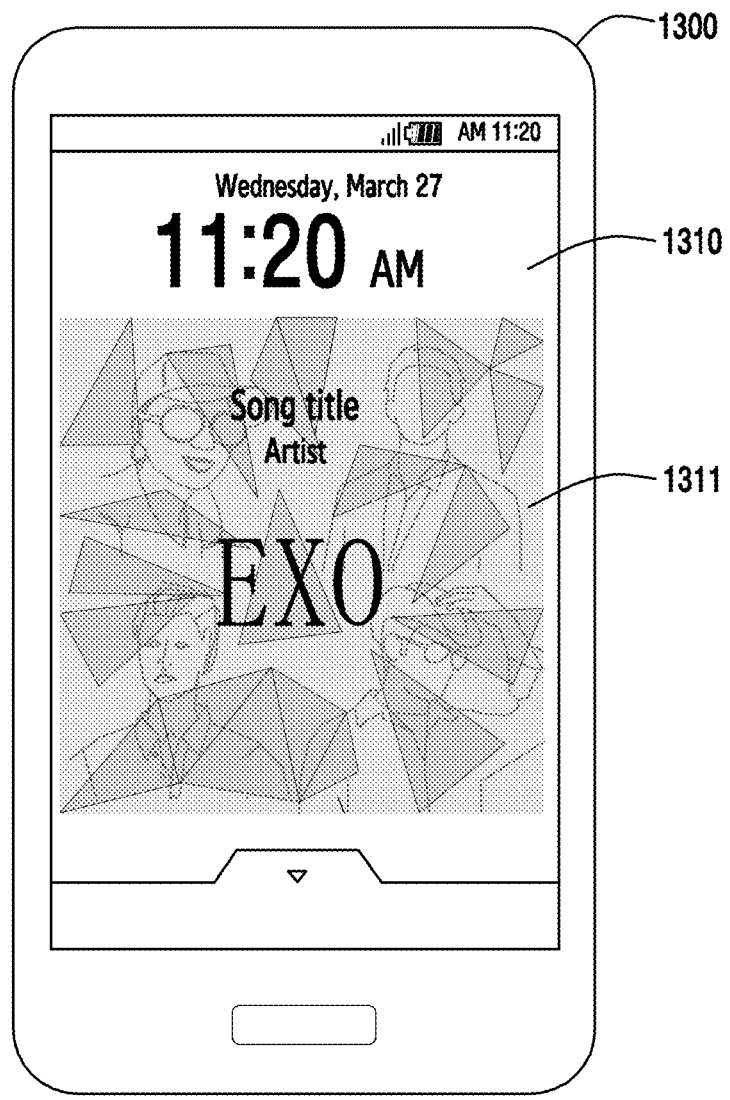
FIG. 13 is a diagram illustrating an example of the operation of the electronic device, according to aspects of the disclosure.

As shown in FIG. 13, an electronic device 1300 can display an album art 1311 in a home screen or lock screen 1310 during the music file play. For example, the electronic device 1300 can change the album art 1311 according to the analyzed music information in various ways. For example, the electronic device may impart a glass-shattering effect on the album art 1311, as shown. The electronic device 1300 can change or synthesize an image displayed in various screens.

Figure 14:
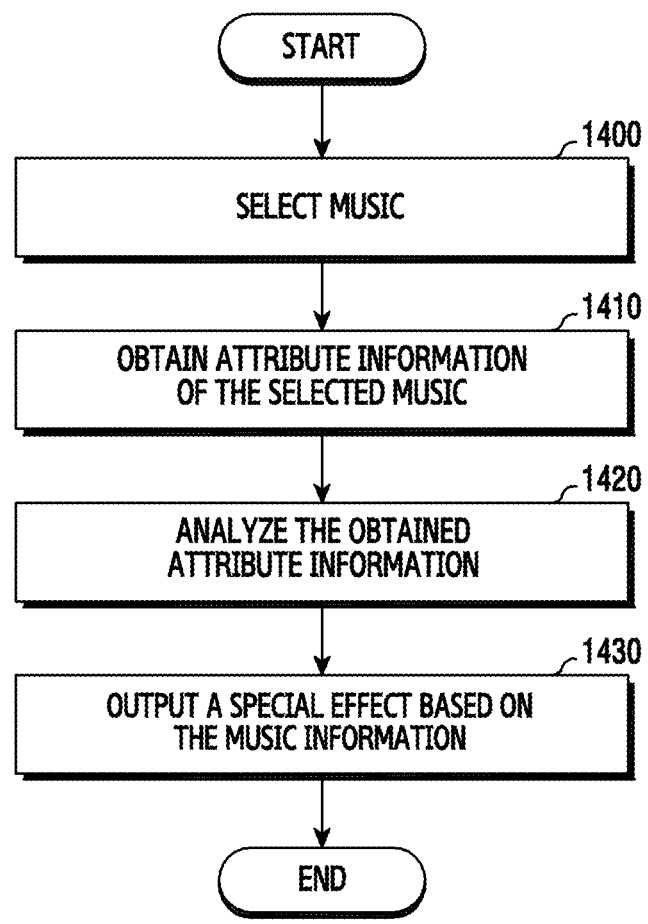
FIG. 14 is a flowchart of an example of a process, according to aspects of ten disclosure.

FIG. 14 is a flowchart of an example of a process, according to aspects of the disclosure.

Referring to FIG. 14, in operation 1400, an electronic device (e.g., the electronic device 100) can select music. The electronic device can select a pre-stored music file or select a music file through an external electronic device (e.g., a server).

In operation 1410, the electronic device can obtain attribute information of the selected music. The music attribute information can include music information indicating attributes of the music. By way of example, the attributes can include at least one of a file type, a file name, a file size, a music genre, a music title, a singer, lyrics, and an album art of the music attribute information. The album art can include an album image (album cover, album picture) of album information of the music file.

In operation 1420, the electronic device can analyze the obtained attribute information. The electronic device can extract a feature value or a pattern of the acquired attribute information, and analyze it using a mathematical algorithm.

In operation 1430, the electronic device can output a special effect based on the music information. The electronic device can change at least one of the brightness, the color, and the chroma of the entire display based on the analyzed attribute information. The electronic device can display an object on the display based on the analyzed attribute information. The object can include, but not limited to, a figure or a letter. The electronic device can impart a motion effect on the figure or the letter. The electronic device can change the album art on the display based on the analyzed attribute information. The electronic device can change at least one of a shape, a size, a color, a brightness, and a chroma of the album art (or another object presented on the display). For example, the electronic device can change or synthesize the album art in various ways, such as by adding a figure or a letter to the displayed album art.

According to various embodiments of the present disclosure, a method for operating an electronic device include obtaining music information of the electronic device; analyzing the obtained music information; and visualizing the music information based on the analyzed music information.

The music information can include at least one of attribute information or play information of a music file.

The obtaining music information of the electronic device includes obtaining at least one of a file type, a file name, a file size, a music genre, a music title, a singer, lyrics, and an album art of the attribute information of the music file, or obtaining at least one of a tone, a volume level, a pitch, a rhythm, a tempo, a meter, and a texture of the play information of the music file.

The analyzing obtained music information includes extracting a feature value or a music pattern of the obtained attribute information or play information of the music file.

The visualizing music information based on the analyzed music information includes adding a special effect to a display based on the obtained attribute information or play information of the music file.

The method further includes further adding the special effect to the display according to a touch input on the display.

The adding special effect includes changing at least one of a brightness, a color, and a chroma of the display based on the obtained attribute information or play information of the music file.

The adding special effect to the display includes displaying an object on the display based on the obtained attribute information or play information of the music file.

The adding special effect to the display includes changing lyrics or an album art on the display based on the obtained attribute information or play information of the music file.

The method further includes outputting a vibration or a sound based on the analyzed music information.

Figure 15:
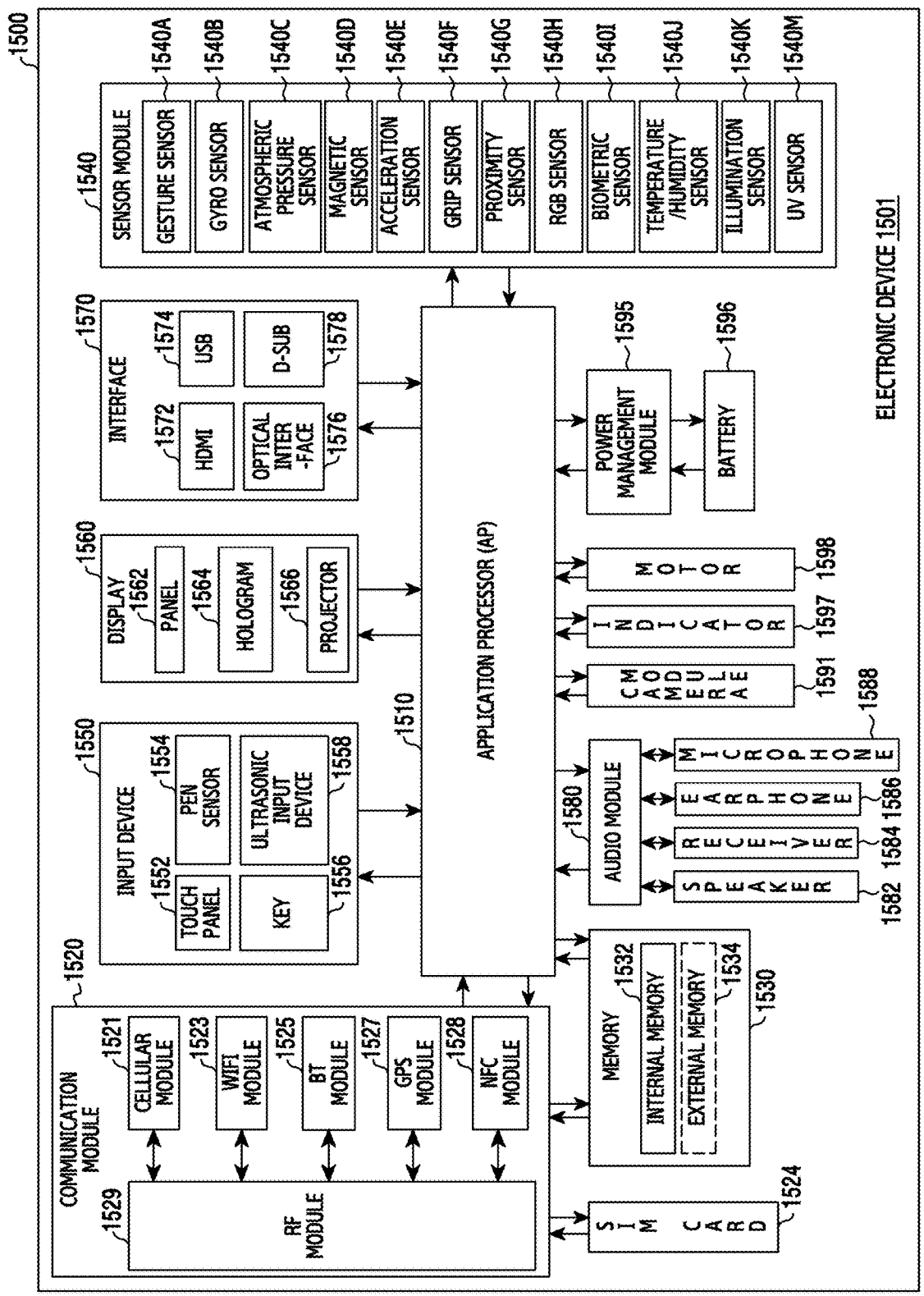
FIG. 15 is a block diagram of an example of an electronic device, according to aspects of the disclosure.

FIG. 15 illustrates a block diagram 1500 of an electronic device 1501 according to various exemplary embodiments of the present disclosure. The electronic device 1501 may configure the entirety or part of the electronic device 100 shown in FIG. 1.

Referring to FIG. 15, the electronic device 1501 may include one or more Application Processors (APs) 1510, a communication module 1520, a Subscriber Identification Module (SIM) card 1524, a memory 1530, a sensor module 1540, an input device 1550, a display 1560, an interface 1570, an audio module 1580, a camera module 1591, a power management module 1595, a battery 1596, an indicator 1597, or a motor 1598.

The AP 1510 may control a plurality of hardware or software elements connected to the AP 1510 by driving an operating system or an application program, and may process and calculate a variety of data including multimedia data. For example, the AP 1510 may be implemented by using a System on Chip (SoC). According to an exemplary embodiment, the AP 1510 may further include a Graphic Processing Unit (GPU) (not shown).

The communication module 1520 may transmit and receive data via communication between the electronic device 1501 (for example, the electronic device 100) and other electronic devices (for example, the electronic device 104 or the server 106) connected through a network. According to an exemplary embodiment, the communication module 1520 may include a cellular module 1521, a WiFi module 1523, a BT module 1525, a GPS module 1527, an NFC module 1528, and a Radio Frequency (RF) module 1529.

The cellular module 1521 may provide a voice call, a video call, a text service, or an internet service through a telecommunications network (for example, LTE, LTE-A, CDMA, WCDMA, UMTS, WiBro, GSM, and the like). In addition, the cellular module 1521 may identify and authenticate the electronic device in the telecommunications network by using a subscriber identification module (for example, the SIM card 1524). According to an exemplary embodiment, the cellular module 1521 may perform at least some of the functions provided by the AP 1510. For example, the cellular module 1521 may perform at least some of the multimedia control functions.

According to an exemplary embodiment, the cellular module 1521 may include a Communication Processor (CP). In addition, the cellular module 1521 may be implemented by using a SoC, for example. In FIG. 15, the cellular module 1521 (for example, the communication processor), the memory 1530, or the power management module 1595 are elements separate from the AP 1510. However, according to an exemplary embodiment, the AP 1510 may be configured to include at least some of the above-described elements (for example, the cellular module 1521).

According to an exemplary embodiment, the AP 1510 or the cellular module 1521 (for example, the communication processor) may load instructions or data received from a non-volatile memory connected therewith or at least one of the other elements into a volatile memory, and may process the instructions or data. In addition, the AP 1510 or the cellular module 1521 may store data which is received from at least one of the other elements or generated by at least one of the other elements in the non-volatile memory.

The WiFi module 1523, the BT module 1525, the GPS module 1527, or the NFC module 1528 each may include a processor for processing data received and transmitted through a corresponding module. In FIG. 15, the cellular module 1521, the WiFi module 1523, the BT module 1525, the GPS module 1527, or the NFC module 1528 is illustrated in a separate block. However, according to an exemplary embodiment, at least some (for example, two or more) of the cellular module 1521, the WiFi module 1523, the BT module 1525, the GPS module 1527, or the NFC module 1528 may be included in a single integrated chip (IC) or a single IC package. For example, at least some of the processors corresponding to the cellular module 1521, the WiFi module 1523, the BT module 1525, the GPS module 1527, and the NFC module 1528 (for example, the communication processor corresponding to the cellular module 1521 and the WiFi processor corresponding to the WiFi module 1523) may be implemented by using a single SoC.

The RF module 1529 may transmit and receive data, for example, may transmit and receive an RF signal. Although not shown, the RF module 1529 may include a transceiver, a Power Amp Module (PAM), a frequency filter, or a Low Noise Amplifier (LNA), for example. In addition, the RF module 1529 may further include a part for exchanging electromagnetic waves in a free space in wireless communication, for example, a conductor or conducting wire. In FIG. 15, the cellular module 1521, the WiFi module 1523, the BT module 1525, the GPS module 1527, and the NFC module 1528 share the single RF module 1529 with one another. However, according to an exemplary embodiment, at least one of the cellular module 1521, the WiFi module 1523, the BT module 1525, the GPS module 1527, or the NFC module 1528 may transmit and receive an RF signal through a separate RF module.

The SIM card 1524 may be a card including a subscriber identification module, and may be inserted into a slot formed on a specific location of the electronic device. The SIM card 1524 may include unique identification information (for example, an Integrated Circuit Card Identifier (ICCID)) or subscriber information (for example, International Mobile Subscriber Identity (IMSI)).

The memory 1530 (for example, the memory 130) may include an internal memory 1532 or an external memory 1534. For example, the internal memory 1532 may include at least one of a volatile memory (for example, a Dynamic Random Access Memory (DRAM), a Static Random Access Memory (SRAM), a Synchronous DRAM (SDRAM), and the like) and a non-volatile memory (for example, an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a NAND flash memory, a NOR flash memory, and the like).

According to an exemplary embodiment, the internal memory 1532 may be a Solid State Drive (SSD). The external memory 1534 may further include a flash drive, for example, Compact Flash (CF), Secure Digital (SD), Micro-SD, Mini-SD, extreme-Digital (xD), a memory stick, and the like. The external memory 1534 may be functionally connected with the electronic device 1501 through various interfaces. According to an exemplary embodiment, the electronic device 1501 may further include a storage device (or a storage medium) such as a hard drive.

The sensor module 1540 may measure a physical quantity or detect an operation state of the electronic device 1501, and may convert measured or detected information into electric signals. The sensor module 1540 may include at least one of a gesture sensor 1540A, a gyro sensor 1540B, a barometric pressure sensor 1540C, a magnetic sensor 1540D, an acceleration sensor 1540E, a grip sensor 1540F, a proximity sensor 1540G, a color sensor 1540H (e.g., Red, Green, Blue (RGB) sensor), a biosensor 1540I, a temperature/humidity sensor 1540J, an illumination sensor 1540K, and a Ultraviolet (UV) sensor 1540M. Additionally or alternatively, the sensor module 1540 may include an E-nose sensor (not shown), an electromyography (EMG) sensor (not shown), an electroencephalogram (EEG) sensor (not shown), an electrocardiogram (ECG) sensor (not shown), an infrared ray (IR) sensor, an iris sensor (not shown), a fingerprint sensor (not shown), and the like. The sensor module 1540 may further include a control circuit to control at least one sensor included therein.

The input device 1550 may include a touch panel 1552, a (digital) pen sensor 1554, a key 1556, or an ultrasonic input device 1558. The touch panel 1552 may recognize a touch input in at least one method of capacitive, resistive, infrared, and ultrasonic methods. In addition, the touch panel 1552 may further include a control circuit (not shown). In the embodiment of a capacitive method, the touch panel 1552 may recognize physical contact or hovering. The touch panel 1552 may further include a tactile layer. In this embodiment, the touch panel 1552 may provide a tactile response to the user.

The (digital) pen sensor 1554 may be implemented in the same or similar method as or to the method of receiving a user's touch input or by using a separate detection sheet. The key 1556 may include a physical button, an optical key, or a keypad. The ultrasonic input device 1558 allows the electronic device 1501 to detect sound waves through a microphone (for example, the microphone 1588) through an input device generating ultrasonic signals, and is capable of wireless recognition. According to an exemplary embodiment, the electronic device 1501 may receive a user input from an external device connected thereto (for example, a computer or a server) by using the communication module 1520.

The display 1560 may include a panel 1562, a hologram device 1564, or a projector 1566. For example, the panel 1562 may be a Liquid Crystal Display (LCD) or an Active Matrix Organic Light Emitting Diode (AM-OLED). For example, the panel 1562 may be implemented to be flexible, transparent, or wearable. The panel 1562 may be configured as a single module along with the touch panel 1552. The hologram device 1564 may show a stereoscopic image in the air using interference of light. The projector 1566 may display an image by projecting light onto a screen. The screen may be located inside or outside the electronic device 1501. According to an exemplary embodiment, the display 1560 may further include a control circuit to control the panel 1562, the hologram device 1564, or the projector 1566.

The interface 1570 may include a High Definition Multimedia Interface (HDMI) 1572, a Universal Serial Bus (USB) 1574, an optical interface 1576, or D-subminiature (sub) 1578. The interface 1570 may be included in the communication interface 160 shown in FIG. 1. Additionally or alternatively, the interface 1570 may include a Mobile High Definition Link (MHL) interface, a Secure Digital (SD)/Multimedia Card (MMC) interface or Infrared Data Association (IrDA) standard interface.

The audio module 1580 may convert a sound and an electric signal bidirectionally. The audio module 1580 may process sound information which is input or output through a speaker 1582, a receiver 1584, an earphone 1586, or a microphone 1588.

The camera module 1591 is a device for photographing a still image and a moving image, and, according to an exemplary embodiment, the camera module 1591 may include one or more image sensors (for example, a front surface sensor or a rear surface sensor), a lens (not shown), an Image Signal Processor (ISP) (not shown), or a flash (memory) (for example, a Light Emitting Diode (LED) or a xenon lamp).

The power management module 1595 may manage power of the electronic device 1501. Although not shown, the power management module 1595 may include a Power Management IC (PMIC), a charger IC, or a battery or fuel gage. For example, the PMIC may be mounted in an integrated circuit or a SoC semiconductor.

The charging method may be divided into a wire charging method and a wireless charging method. The charger IC may charge a battery and may prevent inflow of overvoltage or over current from a charger. According to an exemplary embodiment, the charger IC may include a charger IC for at least one of the wire charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, and the like may be added.

For example, the battery gauge may measure a remaining battery life of the battery 1596, a voltage, a current, or temperature during charging. The battery 1596 may store or generate electricity and may supply power to the electronic device 1501 by using stored or generated electricity. The battery 1596 may include a rechargeable battery or a solar battery.

The indicator 1597 may display a specific state of the electronic device 1501 or a part of it (for example, the AP 1510), for example, a booting state, a message state, or a charging state. The motor 1598 may convert an electric signal into a mechanical vibration. Although not shown, the electronic device 1501 may include a processing device (for example, a GPU) for supporting a mobile TV. The processing device for supporting the mobile TV may process media data according to standards such as Digital Multimedia Broadcasting (DMB), Digital Video Broadcasting (DVB), or media flow.

The aforementioned components of the electronic device according to various exemplary embodiments of the present disclosure each can include one or more components, and the name of the corresponding component can differ according to the type of the electronic device. The present electronic device can include at least one of the aforementioned components, omit some components, or further include other components. Also, some of the components of the present electronic device can be united into a single entity to thus carry out the same functions of the corresponding components.

The term "module" used in an embodiment of the present disclosure indicates, for example, a unit including a combination of one or more of hardware, software, or firmware. The "module" can be interchangeably used with the terms, for example, "a unit," "logic," "a logical block," "a component," or "a circuit." The "module" can be a minimum unit or part of the components integrally formed. The "module" may be a minimum unit or part of one or more functions. The "module" can be implemented mechanically or electronically. For example, the "module" can include at least one of an Application-Specific Integrated Circuit (ASIC), a Field-Programmable Gate Array (FPGA), or a programmable-logic device for performing operations which are well known or will be developed.

At least part of the device (e.g., the modules or the functions) or the method (e.g., the operations) described in the appended claims and/or the specifications of the present disclosure can be implemented using, for example, instructions stored as the programming module in a non-transitory computer-readable storage medium. For example, when an instruction is executed by one or more processors (e.g., the processor 120), the one or more processors perform the corresponding function. The non-transitory computer-readable storage medium can be, for example, the memory 130. At least part of the programming module can be implemented (e.g., executed) by the processor 120. At least part of the programming module can include, for example, a module, a program, sets of instructions, or a process for performing one or more functions.

The non-transitory computer-readable recording medium can include magnetic media such as a hard disk, a floppy disk and a magnetic tape, an optical media such as a Compact Disc Read Only Memory (CD-ROM) and a Digital Versatile Disc (DVD), magneto-optical media such as a floptical disk, and hardware devices specifically configured to store and execute an application instruction (e.g., the programming module) such as a Read Only Memory (ROM), a Random Access Memory (RAM), and a flash memory. A program instruction can include not only machine code made by a compiler but also high-level language code executable by a computer using an interpreter. The above-stated electronic device can serve as one or more software modules for fulfilling the operations of an embodiment of the present disclosure, and vice versa.

The module or the programming module according to an embodiment of the present disclosure can include at least one of the aforementioned components, omit some components, or further include other components. The operations fulfilled by the modules, the programming modules, or other components can be carried out in sequence, in parallel, repeatedly, or heuristically. In addition, some operations can be executed in a different order or omitted, or other operations can be added.

In a storage medium storing instructions, the instructions, when executed by at least one processor, control the at least one processor to conduct at least one operation. The at least one operation can include obtaining music information, analyzing the obtained music information, and visualizing the music information based on the analyzed music information.

As set forth above, the method and the apparatus for visualizing the music information obtains and analyzes the music information of the electronic device, and visualizes, auralizes, or tactilizes the music information based on the analyzed music information, thus providing emotional and wide music play experience.

FIGS. 1-15 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
   a display;
   an audio module; and
   at least one processor, coupled to the display and the audio module, configured to:
   identify, in response to receiving user input for reproducing a music file, lyrics of the music file, wherein the lyrics are distinguished by multiple sections respectively correspond to at least one singer associated with the music file;
   in response to an identifying of the multiple sections, display, at least two sections among the multiple sections with at least two images respectively corresponding to the displayed at least two sections, wherein each of the at least two images associated with the at least one singer;
   while reproducing the music file, highlight one section among the displayed at least two sections corresponding to a portion of the music file being reproduced, relative to another section among the displayed at least two sections;
   identify, in response to the identifying of the lyrics, at least part of the lyrics corresponds to at least a part of a title of the music file; and
   highlight the part of the lyrics with a color included in an album art of the music file, relative to other part of the lyrics.

2. The electronic device of claim 1, wherein the at least one processor is configured to:
   identify that a pitch regarding the music file being reproduced rises; and
   in response to identifying the pitch rises, increase a height of a text of the lyrics.

3. The electronic device of claim 1, wherein the at least one processor is configured to change a display of the lyrics based on information regarding the music file being reproduced, and
   wherein the information regarding the music file comprises at least one indication for indicating at least one of a file type of the music file, a file name of the music file, a file size of the music file, a music genre of the music file, a music title of the music file, a singer of the music file, lyrics of the music file, an image associated with the music file, a tone of the music file, a volume level at which the music file is played, a pitch of the music file, a rhythm of the music file, a tempo of the music file, a meter of the music file, or a texture of the music file.

4. The electronic device of claim 1, wherein the at least one processor is further configured to:
   identify that a decibel or a volume level regarding the music file being reproduced rises; and
   in response to identifying the decibel or the volume level rises, enlarge a font size of the lyrics.

5. The electronic device of claim 1, wherein the at least one processor is configured to:
   identify that a tempo regarding the music file being reproduced is slowed down; and
   in response to identifying the tempo is slowed down, increase a letter spacing of the lyrics.

6. The electronic device of claim 1, wherein the at least one processor is further configured to:
   display, via the display, a screen regarding a music file to be reproduced,
   in response to reproducing a music file via the audio module, display a plurality of visual objects floated on the screen regarding the music file,
   identify a pitch or a tempo regarding the music file being reproduced, and
   change, according to the pitch or the tempo, a number of the plurality of visual objects floated on the screen.

7. The electronic device of claim 1, wherein the at least one processor is configured to:
   extract a representative color from an album cover or an album picture of the music file; and
   based on the extracting the representative color, change a color of at least a part of the lyrics to the representative color.

8. The electronic device of claim 1, wherein the at least one processor is configured to:
   display a plurality of shapes superimposed on a screen regarding the music file;
   identify that a decibel or a volume level regarding the music file being reproduced rises; and
   in response to identifying the decibel or the volume level rises, enlarge the plurality of shapes superimposed on the screen.

9. The electronic device of claim 1, wherein the at least one processor is configured to:
   display a plurality of shapes superimposed on a screen regarding the music file;

identify that a tempo regarding the music file being reproduced changes; and in response to identifying that the tempo changes, change an interval of the plurality of shapes.

10. The electronic device of claim 1, wherein the at least one processor is configured to display the at least two sections and the at least two images respectively aligned along two columns being parallel to each other.

* * * * *